March 22, 1966 H. P. BLINCOE ETAL 3,242,438

AUTOMATIC FREQUENCY CONTROL CIRCUIT USING A SHEET-BEAM TUBE

Filed Aug. 13, 1962

INVENTORS
HOMER P. BLINCOE
JOEL D. WELLS

BY Robert J. Haase

ATTORNEY 3,242,438

AUTOMATIC FREQUENCY CONTROL CIRCUIT USING A SHEET-BEAM TUBE

Homer P. Blincoe and Joel D. Wells, Dunedin, Fla., assignors to Sperry Rand Corporation, Great Neck, N.Y., a corporation of Delaware Filed Aug. 13, 1962, Ser. No. 216,519
4 Claims. (Cl. 331—17)

The present invention generally relates to automatic frequency control circuits and, more particularly, to a circuit of such type characterized by improved stability.

A wide variety of automatic frequency control circuits are available in the art. Depending upon the particular application involved, varying degrees of precision of frequency control are required. In all cases, however, it is at least desirable if not imperative that the automatic frequency control circuit be adapted to minimize unavoidable effects such as tube aging, direct current level drifting and other circuit variations in order to stabilize the frequency control action.

Automatic frequency control circuits involve the use of frequency discriminating means having a well known tendency to drift. Should the center frequency of the frequency discriminating circuit depart from its prescribed value, an erroneous output signal is produced which causes the frequency of the controlled source of oscillations to depart from its assigned value. Accordingly, provision must be made to compensate for the effect of such frequency drifting. Additionally, automatic frequency control circuits often employ modulating means to convert the essentially direct current output signal from the frequency discriminating circuit into an equivalent alternating current suitable for amplification by A.C. amplifiers. The purpose of the inversion from D.C. to A.C. is to avoid the necessity of direct current amplifiers notorious for D.C. level drifting. However, any unbalance in the modulating circuit gives rise to an error-inducing signal component which causes the frequency controlled source of oscillations to assume an incorrect frequency value.

It is the principal object of the present invention to provide an automatic frequency control circuit characterized by stability against circuit parameter variations.

Another object of the present invention is to provide an automatic frequency control circuit utilizing a sheet-beam switching tube as an inverter-amplifier.

A further object is to provide in an automatic frequency control circuit an inverter-amplifier which is easily and reliably balanced with respect to the signals applied thereto.

These and other objects of the present invention, as will appear from the following specification are accomplished by the provision of an automatic frequency control circuit including a local oscillator whose frequency is controllable in response to an applied direct current signal. The local oscillator signal is heterodyned in a signal mixer with an incoming signal to produce an intermediate frequency signal. The intermediate frequency signal, in turn, is applied to a conventional frequency discriminating circuit which produces a control signal representing the departure of the intermediate frequency control signal from a prescribed value.

In accordance with the present invention, the control signal is operated upon by a double plate sheet-beam tube arranged in a novel inverter-amplifier circuit configuration. A first deflector plate of the tube is returned to a variable direct current reference voltage source. The control signal from the frequency discriminating circuit is applied to the second deflector plate. A source of alternating current signals of convenient frequency is coupled to the control grid of the tube. In the event that the frequency discriminating circuit output signal departs from the value of the direct current reference voltage applied to the first deflector plate, a square wave signal is produced between the plates of the sheet-beam tube. The amplitude of said square wave is related to the extent of the aforementioned variation of the frequency discriminating circuit output signal. The phase of the square wave, relative to the phase of the reference signal, is indicative of the sense of said variation. The square wave, in turn, is coherently detected and then applied as a direct current frequency control signal to the local oscillator.

Any change in the value of the control signal produced by undesired drift in the frequency discriminating circuit may be readily compensated for by the simple adjustment of the reference potential applied to the first deflector plate of the sheet-beam tube. Other features of the present automatic frequency control circuit include substantial insensitivity to variations in the amplitude of the reference signal applied to the control grid of the sheet-beam tube, marked frequency stability despite any gain variation of the sheet-beam tube, and the dual circuit functioning of the sheet-beam tube to accomplish signal inversion and signal amplification in an efficient manner.

For a more complete understanding of the present invention, reference should be had to the following specification and to the appended figures of which:

Figure 1:
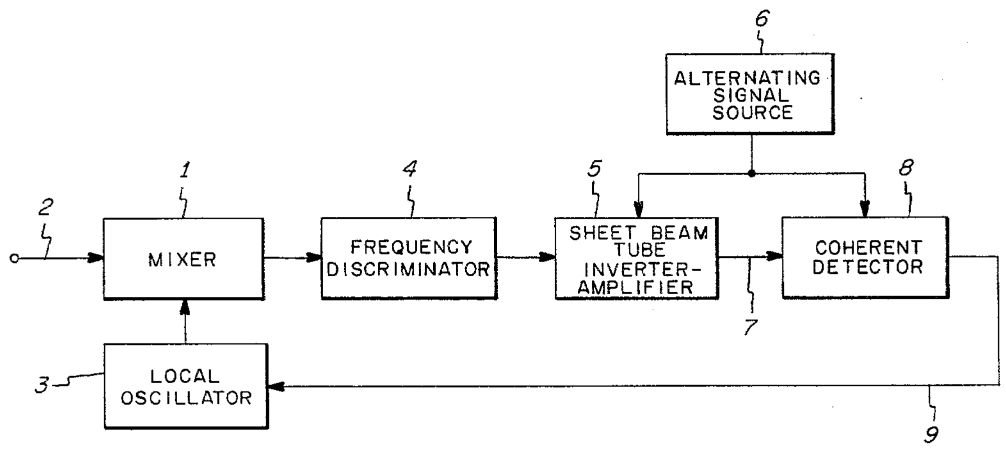
FIG. 1 is a simplified block diagram of a preferred embodiment.

Referring to FIG. 1, an incoming signal is applied to mixer 1 via line 2. It matters not, in terms of the present invention, whether said incoming signal is modulated or unmodulated. In one typical case, the incoming signal may be a frequency varying signal representative of input data. This would be the case, for example, of an airborne Doppler radar signal whose frequency is indicative of aircraft ground speed. In another ordinary case, the input signal may be a conventional broadcast frequency modulated signal whose nominal or carrier frequency value is substantially invariant. In either case, the automatic frequency control circuit to be described would function to maintain the frequency of local oscillator 3 in a fixed relationship to the frequency of the incoming signal whereby oscillator 3 is frequency stabilized with respect thereto.

The output signal of oscillator 3 is applied to a second input of mixer 1 wherein it is heterodyned with the incoming signal applied via line 2. The lower sideband signal is selected within mixer 1 and applied to conventional frequency discriminator 4. The center frequency of discriminator 4 is fixed to a prescribed intermediate frequency value equalling a desired frequency difference between the incoming signal and the local oscillator signal.

Frequency discriminator 4 produces a control signal representing the departure, if any, of the intermediate frequency signal from the aforementioned prescribed value. The control signal is applied to inverter-amplifier 5 to be described in detail in connection with FIG. 2. Inverter-amplifier 5 also receives an alternating signal of convenient frequency from source 6 to produce on line 7 a square wave signal having an amplitude related to the extent of said frequency departure and a phase, relative to the phase of the signal of source 6, indicative of the sense of said frequency departure. The square wave signal, in turn, is applied to coherent detector 8 which also receives the alternating signal produced by source 6. As discussed beginning on page 437 of Introduction to Radar Systems by Merrill I. Skolnik, McGraw-Hill, 1962, a coherent detector consists of an oscillator feeding a mixer which also receives a signal of known frequency and known phase which is to be detected. The output of the mixer is connected to a low pass filter which allows substantially only the direct current component to pass. In order to emphasize the fact that the same oscillator provides signals for both coherent detector 8 and the inverter-amplifier 5, the oscillator of coherent detector 8 has been shown separately as alternating signal source 6. Said square wave is coherently detected and filtered within detector 8 to produce on line 9 a substantially direct current signal having an amplitude determined by the aforementioned frequency departure of the intermediate frequency signal produced at the output of mixer 1 from its prescribed value and a polarity indicative of the sense of said departure. The signal on line 9 is applied to local oscillator 3 to control the frequency thereof. In an illustrative case where the incoming signal appearing on line 2 is a microwave frequency signal, local oscillator 3 may be a klystron having a repeller electrode to which the frequency control signal on line 9 is applied.

Figure 2:
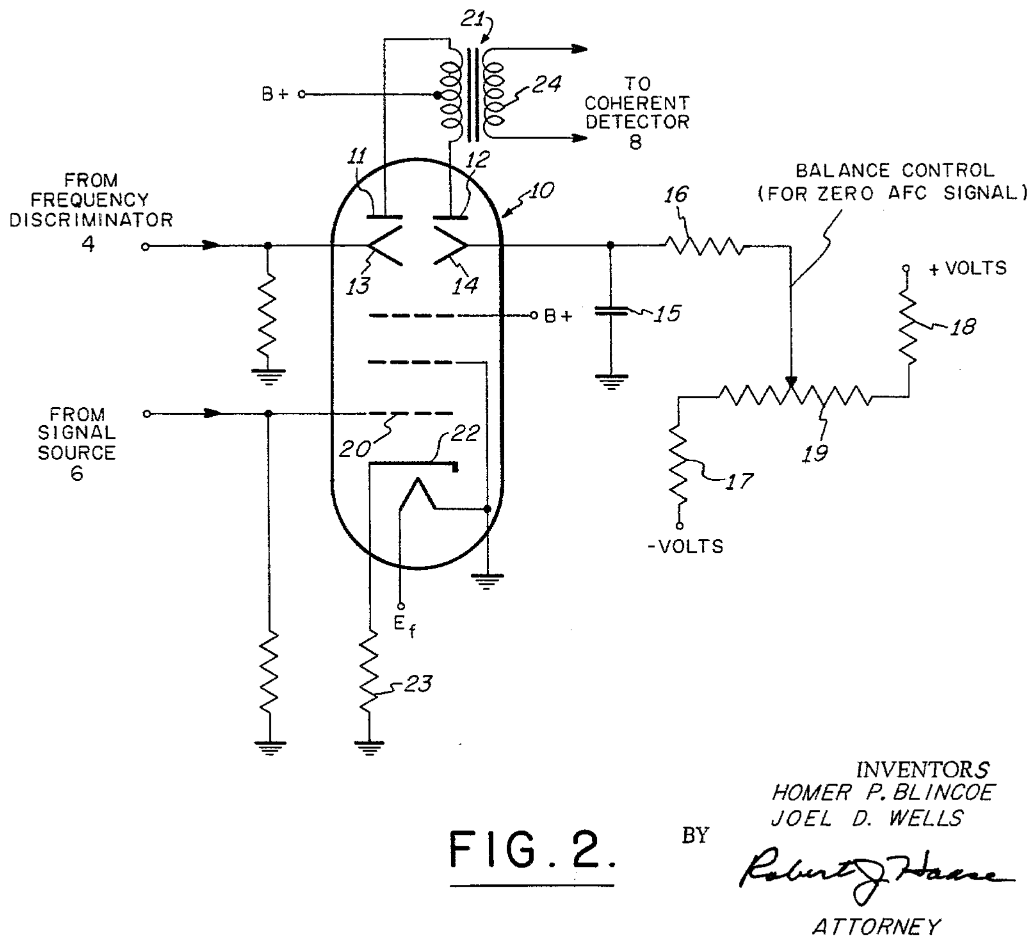
FIG. 2 is a simplified schematic diagram of a double-plate sheet-beam tube inverter-amplifier circuit suitable for use in the automatic frequency control circuit of FIG. 1.

The reference numeral 10 of FIG. 2 represents a double plate sheet-beam tube such as a type 6AR8 having output plates 11 and 12, deflector plates 13 and 14 and control grid 20. The control signal from discriminator 4 is applied to deflector plate 13. A direct current reference voltage is supplied to deflector plate 14 by a filtered power supply comprising capacitor 15, resistors 16, 17 and 18, potentiometer 19 and the indicated voltage sources. The amplitude of the reference voltage is adjusted by means of potentiometer 19 so that the sheet-beam of tube 10 divides equally between output plates 11 and 12 when the intermediate frequency signal at the output of mixer 1 equals a prescribed frequency value. The alternating signal generated by source 6 is applied to control grid 20 to intensity modulate the sheet beam of tube 10. Plates 11 and 12 are connected via the center tapped primary of transformer 21 to a source of positive potential. Cathode 22 of tube 10 is returned to ground through resistor 23.

In operation, assuming that the intermediate frequency signal produced by mixer 1 is at its prescribed value, whereby the potential of deflector plate 13 is the same as the potential of deflector plate 14, the intensity modulated sheet-beam divides equally between plates 11 and 12 to produce at said plates in-phase and equal amplitude square wave signals. The equal amplitude square waves cancel each other in the center tapped primary of transformer 21 to produce no net output signal in secondary 24. In this case, no output signal is provided by coherent detector 8 and no frequency control signal is applied to local oscillator 3. In the event that the intermediate frequency signal departs from its prescribed value, the control signal applied to deflector plate 13 no longer equals the reference voltage applied to deflector plate 14. The sense of the resultant potential difference between deflector plates 13 and 14 depends upon the sense of the frequency departure of the intermedate frequency signal from its prescribed value.

The output plate associated with the deflector plate having the more positive potential will receive the greater portion of the divided sheet-beam. Accordingly, the amplitude of the square wave produced at said deflector plate will be greater than the amplitude of the square wave produced at the other deflector plate. The square waves now no longer cancel in the primary of transformer 21 whereby a net square wave is produced across secondary 24 having an amplitude representing the extent of the frequency departure of the intermediate frequency signal and a phase, relative to the phase of the alternating signal applied to control grid 20, representing the sense of said frequency departure. The square wave across secondary 24 is coherently detected within detector 8 of FIG. 1 which also receives the same alternating signal applied to control grid 20 of tube 10 to provide an appropriate frequency control signal on line 9. The control signal changes the frequency of local oscillator 3 to restore the frequency of the intermediate frequency signal produced by mixer 1 to its prescribed value.

It should be noted that so long as the sheet-beam is substantially equally divided between plates 11 and 12, no output signal appears across secondary 24 despite variations in the amplitude of the alternating signal applied to control grid 20. Such amplitude variations equally change the magnitudes of the currents received by plates 11 and 12; the variations do not change the difference between the amplitudes of the square waves developed at the respective output plates 11 and 12. Hence, the net square wave appearing across transformer secondary 24 is substantially unchanged. The same result obtains from changes in the gain of tube 10.

It should be observed that tube 10 may be readily "balanced" with respect to the signal applied to deflector plate 13. This may be accomplished by adjustment of potentiometer 19. Potentiometer 19 may also be regarded as a means for determining or adjusting the prescribed value desired of the intermediate frequency signal produced by mixer 1. In any case, the amplitude of the square wave appearing across tarnsformer secondary 24 will change in accordance with the setting of potentiometer 19 for a given difference between the frequency of the incoming signal appearing on line 2 and the frequency of the signal provided by local oscillator 3.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. An automatic frequency control circuit comprising,
frequency discriminating means for generating a control signal representing the departure in frequency of an incoming signal from a prescribed frequency,
a double plate sheet-beam tube having a pair of output plates, a pair of deflector plates and a control grid,
said control signal being applied to a first one of said deflector plates,
a source of alternating current signals coupled to said control grid,
means for differentially combining the potentials produced at said output plates to produce a substantially square wave signal,
and means for coherently detecting said square wave signal to produce a signal for controlling the frequency of said incoming signal.

2. An automatic frequency control circuit comprising,
frequency discriminating means for generating a control signal representing the frequency difference between an incoming signal and a local oscillator signal,
a double plate sheet-beam tube having a pair of output plates, a pair of deflector plates and a control grid,
said control signal being applied to a first one of said deflector plates,
a source of direct current signals coupled to the other of said deflector plates,
a source of alternating current signal coupled to said control grid,
means for differentially combining the potentials produced at said output plates to produce a substantially square wave signal,
and means for coherently detecting said square wave signal to produce a signal for controlling the frequency of said local oscillator.

3. An automatic frequency control circuit comprising,
a local oscillator, a signal mixer adapted to receive an incoming signal and the signal generated by said local oscillator,
frequency discriminating means coupled to the output of said signal mixer for generating a control signal representing the frequency difference between said incoming signal and said local oscillator signal,
a double plate sheet-beam tube having a pair of output plates, a pair of deflector plates and a control grid,
said control signal being applied to a first one of said deflector plates,
a source of direct current signals coupled to the other of said deflector plates,
a source of alternating current signal coupled to said control grid,
means for differentially combining the potentials produced at said output plates to produce a substantially square wave signal,
said means for coherently detecting said square wave signal to produce a signal for controlling the frequency of said local oscillator.

4. An automatic frequency control circuit comprising,
a controllable frequency local oscillator,
a signal mixer adapted to receive an incoming signal and the signal generated by said local oscillator,
frequency discriminating means coupled to the output of said signal mixer for generating a control signal representing the frequency difference between said incoming signal and said local oscillator signal,
a double plate sheet-beam tube having a pair of output plates, a pair of deflector plates, and a control grid,
said control signal being applied to a first one of said deflector plates,
a source of controllable amplitude direct current signal coupled to the other of said deflector plates,
a source of alternating current signal coupled to said control grid,
center tapped transformer means coupled to said output plates for differentially combining the potentials produced at said output plates to produce a substantially square wave signal,
and means for coherently detecting said square wave signal to produce a signal for controlling the frequency of said local oscillator.

References Cited by the Examiner

UNITED STATES PATENTS

| | | | |
|---|---|---|---|
| 2,832,847 | 4/1958 | Goldstine | 330—46 |
| 2,946,961 | 6/1960 | Lind | 328—146 |
| 3,089,099 | 5/1963 | Beckerich et al. | 328—254 X |

ROY LAKE, *Primary Examiner.*

JOHN KOMINSKI, *Examiner.*